(12) United States Patent
Maschwitz

(10) Patent No.: US 6,416,872 B1
(45) Date of Patent: Jul. 9, 2002

(54) HEAT REFLECTING FILM WITH LOW VISIBLE REFLECTANCE

(75) Inventor: Peter Maschwitz, Martinsville, VA (US)

(73) Assignee: CP Films, Inc., Martinsville, VA (US)

( * ) Notice: Subject to any disclaimer, the term of this patent is extended or adjusted under 35 U.S.C. 154(b) by 2 days.

(21) Appl. No.: 09/651,082

(22) Filed: Aug. 30, 2000

(51) Int. Cl.[7] .......................... B32B 15/04; B32B 17/06
(52) U.S. Cl. ...................... 428/469; 428/426; 428/428; 428/472
(58) Field of Search ................ 428/426, 428, 428/469, 472

(56) References Cited

U.S. PATENT DOCUMENTS

| | | |
|---|---|---|
| 3,682,528 A | 8/1972 | Apfel |
| 3,990,784 A | 11/1976 | Gelber |
| 4,259,401 A | 3/1981 | Chalroudi |
| 4,335,166 A | 6/1982 | Lizardo |
| 4,613,530 A | 9/1986 | Hood |
| 4,721,636 A | 1/1988 | Hood |
| 4,799,745 A | 1/1989 | Meyer |
| 4,838,648 A | 6/1989 | Phillips |
| 5,061,568 A | 10/1991 | Kessel |
| 5,071,206 A | 12/1991 | Hood |
| 5,105,310 A | 4/1992 | Dickey |
| 5,183,700 A | 2/1993 | Austin |
| 5,189,551 A | 2/1993 | Woodard |
| 5,214,530 A | 5/1993 | Coombs |
| 5,229,881 A | 7/1993 | Day |
| 5,264,099 A | 11/1993 | Szcyrbowski |
| 5,278,590 A | 1/1994 | Phillips |
| 5,279,722 A | 1/1994 | Szcyrbowski |
| 5,337,191 A | 8/1994 | Austin |
| 5,344,718 A | 9/1994 | Hartig |
| 5,377,045 A | 12/1994 | Wolfe |
| 5,411,794 A | 5/1995 | Kawaguchi |
| 5,413,864 A | 5/1995 | Miyazaki |
| 5,473,468 A | 12/1995 | Rudigier |
| 5,506,037 A | 4/1996 | Termath |
| 5,510,173 A | 4/1996 | Pass |
| 5,514,476 A | 5/1996 | Hartig |
| 5,521,765 A | 5/1996 | Wolfe |
| 5,529,849 A | 6/1996 | D'Errico |
| 5,532,062 A | 7/1996 | Miyazaki |
| 5,563,734 A | 10/1996 | Wolfe |

FOREIGN PATENT DOCUMENTS

| | | |
|---|---|---|
| GB | 2 279 365 A | 1/1995 |
| WO | WO 99/28258 | 6/1999 |
| WO | WO 00/70373 | 11/2000 |

OTHER PUBLICATIONS

XP-00219599 Derwent Database Publication; Abstract of AU200048985.

*Primary Examiner*—Deborah Jones
*Assistant Examiner*—Andrew T. Piziali
(74) *Attorney, Agent, or Firm*—Bacon & Thomas (57) ABSTRACT

The invention is a heat reflecting transparent window cover having three layers. The composite has a substrate and a unique heat reflective stack disposed upon the substrate. The heat reflective stack has, in series, a first interference layer, an infrared reflecting metal layer, a second interference layer and a first non-infrared reflective layer. The first interference layer has an index of refraction which differs from the index of refraction of the substrate by at least about 0.1. The first non-infrared reflective layer is composed of the material from one of the following groups of materials: (i) metals having an index of refraction greater than about 1.0 and an extinction coefficient greater than about 2.0, and (ii) non-metals having an index of refraction greater than about 0.5 and an extinction coefficient greater than about 0.5.

26 Claims, 7 Drawing Sheets

HEAT REFLECTING FILM WITH LOW VISIBLE REFLECTANCE

FIELD OF THE INVENTION

This invention relates generally to heat reflecting fenestration composites and, more particularly, to such composites of the dielectric-metal-dielectric type.

BACKGROUND OF THE INVENTION

For the past few decades, heat reflecting fenestration composites have been in use to improve the energy transmission and appearance of transparent glazing used in commercial buildings, residential buildings and vehicles. The purpose for using these heat reflecting fenestration composites is generally to alter the solar energy transmission, reflection, absorption or emission of various glazing products. The most common purpose for using heat reflecting fenestration composites is to reduce solar heat gain by reflecting or absorbing as much infrared energy as possible without degrading the visible characteristics of the fenestration structure. It is usually desirable to create a transparent glazing with high to medium visible transmission and low visible reflection on both sides of the energy control sheet. It is also desirable that transmission and reflection on either side of the sheet are neutral to slightly blue-green in color. Implementing these properties in a glazing is usually done with optical thin film coatings vacuum deposited on one surface of a transparent glazing material.

A typical heat reflecting thin film product is a five layer thin film structure consisting of: dielectric/infrared reflecting metal/dielectric/infrared reflecting metal/dielectric ("D/M/D/M/D"). Layer thicknesses and material choices for this design must be specifically controlled to achieve the desired optical spectrum. The dielectric layers typically chosen have high indices of refraction ranging from 1.8 to 2.5 and are often materials such as $In_2O_3$, $SnO_2$, $TiO_2$, $Nb_2O_5$, $Ta_2O_5$, ZnO and SiN. Designs using lower index dielectric materials such as polymers are known but less commonly made. The infrared reflecting layers typically consist of silver or alloys of silver but may be variations of gold, copper or even conductive compounds such as titanium nitride.

Different versions of this heat reflecting interference stack include designs with more or less metal/dielectric pairs. Three-layer (D/M/D) and seven-layer (D/M/D/M/D/M/D) designs are also commonly employed.

Three-layer designs are much less expensive to manufacture than five-layer designs and seven-layer designs, but have traditionally suffered from several disadvantages. First of all, three-layer designs exhibit desirable low visible reflectance levels less than 10%) only when the substrate and one surface of the thin film layer are left exposed to air. When a three-layer design is laminated so that both sides of the thin film stack are in contact with polymer or other material with indices greater than 1.0, visible reflectance often rises to levels of 13 to 25%, levels which are undesirable in many applications. The reason for this difference has to do with the optical coupling of the three-layer stack with air (having a reflective index of 1.0) versus the coupling with polymer (having a reflective index of 1.4–1.7). Effective antireflection of the reflective metal by the dielectric requires that there be a large index gradient between the dielectric and the medium it contacts on the side opposite the reflective metal. In a commercially acceptable three-layer stack, one side stack must have this wider index gradient from dielectric to surrounding medium to retain the desired lower reflectance levels. Consequently, three-layer designs have previously been found to be impractical when used in composites where it is not desirable to leave one side of the composite exposed to the air. Such designs include the many composites wherein the heat reflecting stack is sandwiched between two substrate layers.

Another disadvantage with three layer designs has to do with the difficulty in lowering the transmission of visible light through the product to below about 70%. Often, it is desirable to lower visible transmission below 70% to minimize the transmission of solar radiation. Visible transmissions between about 40% to about 60% are considered ideal for many solar control applications. At transmission is percentages in this range, heat transmission is markedly reduced without adversely affecting the overall quality of the product as a transparent window covering. In three layer designs, it is traditionally difficult to reduce the visible transmission to the 40%–60% range without causing secondary problems. For example, reducing visible transmission by increasing the thickness of the metal reflective layer almost always entails an undesirable reflectance color. On the other hand, use of the pigments or dyes to reduce transmission generally creates problem of non-uniform color or non-uniform fading of the pigments or dyes over time.

Accordingly, there is a need to modify the prior art three layer heat reflective film to avoid the above-described problems with the prior art—in an effective and inexpensive manner.

SUMMARY

The present invention satisfies this need. The invention is a heat reflective composite comprising, in series, a first substrate and a heat reflective stack disposed upon the first substrate. The heat reflective stack comprises:

(1) a first interference layer;

(2) an infrared reflecting metal layer deposited onto the first interference layer;

(3) a second interference layer; and (4) a non-infrared reflective layer deposited onto the second interference layer, the non-infrared reflective layer being composed of a material selected from the group of materials consisting of (i) metals having an index of refraction greater than about 1.0 and an extinction coefficient greater than about 2.0 and (ii) non-metals having an index of refraction greater than about 0.5 and having an extinction coefficient greater than about 0.5.

Typically, the first substrate is a pane of glass or a thin plastic material which can be applied to a pane of glass. The first and second interference layers are typically dielectric materials, such as metal oxides having indices of refraction in the visible wavelengths between about 1.8 and about 2.5. The infrared reflecting metal layer is typically silver, gold, copper or alloys thereof.

The non-infrared reflective layer is typically a layer of titanium, tantalum, niobium, chromium, molybdenum, stainless steel or nickel alloy.

The invention has been found to provide an improved heat reflective stack which is effective even when one side of the heat reflective stack is not exposed to the air. Thus, even where the heat reflective stack is sandwiched between two substrate layers, the heat reflective stack is effective in reducing heat and light transmission without undue reflectance and without adversely affecting the color of transmitted light.

DRAWINGS

These features, aspects and advantages of the present invention will become better understood with regard to the following description, appended claims and accompanying figures where:

DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well.

Figure 1:
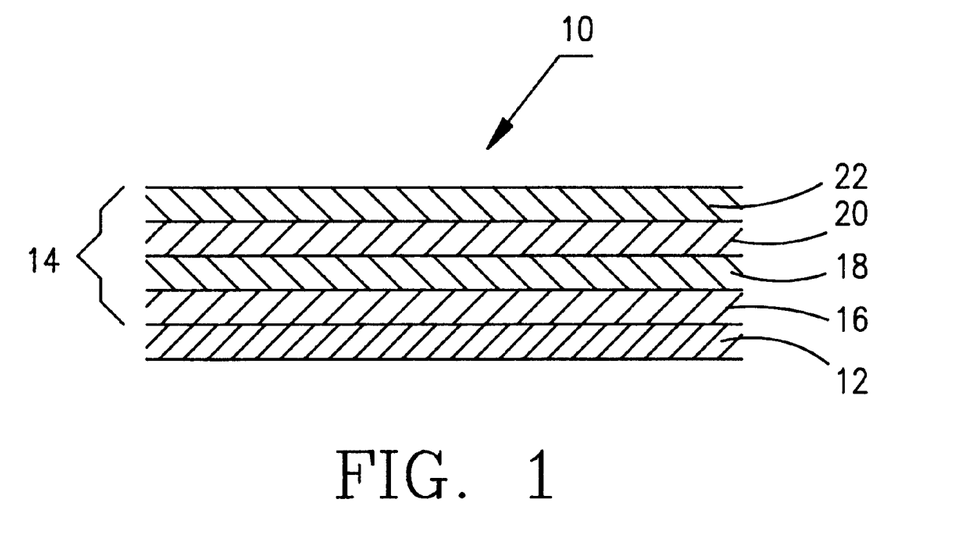
FIG. 1 is a cross-sectional side view of a heat-reflecting fenestration composite having features of the invention.
Figure 2:
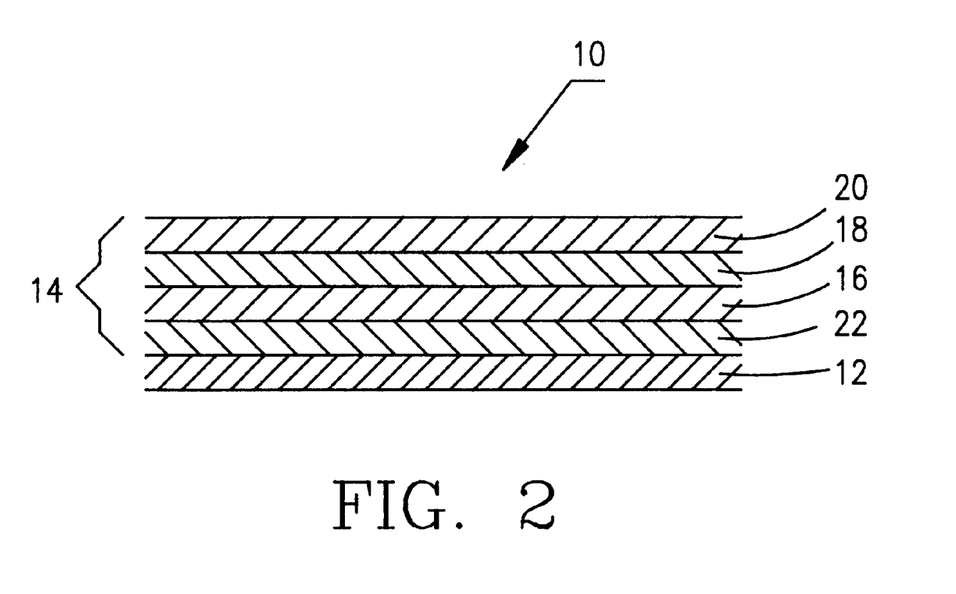
FIG. 2 is a cross-sectional side view of a second heat-reflecting fenestration composite having features of the invention.

As illustrated in the drawings, the invention is a heat reflective composite 10 having a first substrate 12 and a unique heat reflective stack 14 disposed upon the first substrate 12. The heat reflective stack comprises a first interference layer 16, an infrared reflecting metal layer 18, a second interference layer 20 and a first non-infrared reflective layer 22. FIGS. 1 and 2 illustrate the invention 10 in its most basic form.

The first substrate 12 can be any light transmissive substance. Typically, the first reflective substrate 12 is a pane of glass or a sheet of a transparent thermoplastic, such as polyethylene terephthalate ("PET"). Where the first substrate 12 is made from a transparent thermoplastic, the index of refraction of the first substrate 12 will typically be between about 1.4 and 1.7. The index of refraction for PET is approximately 1.65.

Where the first substrate 12 is a pane of glass, the first substrate 12 will have a typical have a thickness of between about 3 mm and about 6 mm. In embodiments wherein the first substrate 12 is a transparent thermoplastic, such as polyethylene terephthalate, the thickness of the first substrate 12 is typically between about 12 microns and about 300 microns.

Preferably, the first interference layer 16 has an index of refraction which differs from the index of refraction of the first substrate 12 by at least about 0.1, most preferably by at least about 0.2.

The first interference layer 16 can be a metal oxide, such as an oxide of magnesium, aluminum, titanium, chromium, zinc, zirconium, niobium, molybdenum, indium, tin, tantalum, tungsten, bismuth or a combination of such oxides. Alternatively, the first interference layer 16 can be a nitride of silicon or aluminum. The first interference layer 16 can also be a polymer, such as a vacuum deposited acrylate. In a typical embodiment, the first interference layer 16 is zinc oxide, tin oxide or indium oxide, having an index of refraction between about 1.9 and about 2.1.

Preferably, the first interference layer 16 has an extinction coefficient between about 0.0 and about 0.5.

The first interference layer 16 is deposited adjacent to the first substrate 12 in a thickness of between about 0.3 QWOT and about 1.0 QWOT. The term "QWOT" as used herein means "quarter wave optical thickness." In a typical embodiment, the physical thickness of the first interference layer 16 is between about 20 mm and about 70 nm.

The infrared reflecting metal layer 18 is typically a layer of metal comprised of silver, gold, copper, aluminum, copper, alloys thereof or titanium nitride. In preferred embodiments, the infrared reflecting metal layer 18 is essentially silver or is an alloy of silver and copper or silver and gold. In one preferred embodiment, the infrared reflecting metal layer 18 is an alloy of silver and copper wherein the percentage of copper is between about 3 wt. % and about 20 wt. %.

The heat reflective metal layer 18 is deposited onto the first interference layer 18 in a thickness of between about 8 nm and about 20 nm, preferably between about 9 nm and about 15 nm.

The heat reflective metal layer 18 may further comprise one or more cladding layers, generally of a dissimilar metal, metal alloy, or metal compound, to protect the heat reflective metal from corrosion or other degradation processes.

The second interference layer 20 can be a metal oxide, such as an oxide of magnesium, aluminum, silicon, titanium, chromium, zinc, zirconium, niobium, molybdenum, indium, tin, tantalum, tungsten, bismuth or a combination of these oxides. Alternatively, the second interference layer 20 can be a nitride of silicon or aluminum. The second interference layer 20 can also be magnesium fluoride. Mixtures of these aforementioned materials can also be used in the second interference layer 20. The second interference layer 20 can also be a polymer, such as a vacuum deposited acrylate. In a typical embodiment, the second interference layer 20 is zinc oxide, tin oxide or indium oxide, having an index of refraction between about 1.9 and about 2.1.

Like the first interference layer 16, the second interference layer 20 preferably has an extinction coefficient between about 0.0 and about 0.5.

The second interference layer 20 is deposited on the opposite side of the infrared reflecting metal layer 18 from the sides closest to the first interference layer 16. The thickness of the second interference layer 20 is typically between about 30 nm and about 120 nm, most typically between about 50 nm and about 90 nm.

Both the first and second interference layers 16 and 20 can be a single, homogeneous material. Alternatively, one or both of the interference layers can be a mixture of different materials or two or more discreet layers, each comprising a different material.

The first non-infrared reflective layer 22 is deposited onto the second interference layer 20. The first non-infrared reflective layer 22 is composed of a material from one of the following groups of materials: (i) metals having an index of refraction greater than about 1.0 in the visible wavelengths and an extinction coefficient greater than about 2.0, and (ii) non-metals having an index of refraction greater than about 0.5 and an extinction coefficient greater than about 0.5.

In a typical embodiment, the non-infrared reflective layer 22 is essentially metallic, having an index of refraction between about 1.3 and about 3.0, and having an extinction coefficient between about 2.1 and about 4.0.

The first non-infrared reflective layer 22 is typically a titanium, tantalum, chromium, molybdenum, nickel alloy, stainless steel, mixtures thereof or a metal carbide, metal silicide or nitride such as tungsten doped titanium nitride. In a preferred embodiment, the first non-infrared reflective metal layer 22 is stainless steel or nickel alloy due to their desirable optical properties of neutral gray color, low reflectance and high optical absorption. Alternatively, the first non-infrared reflective layer 22 can be essentially non-metallic, such as first non-infrared reflective layers made from carbon, silicon, germanium, mixtures thereof, or compounds of these materials.

In another embodiment, the first non-infrared reflective layer 22 has an extinction coefficient which increases with wavelengths in the visible wavelengths. For example, where the first non-infrared reflective layer 22 is titanium nitride or metal doped titanium nitride, the extinction coefficient of the first non-infrared reflective layer 22 is 0.03 at 400 nm wavelength and 1.5 at 650 nm wavelength.

FIG. 1 illustrates a first basic-most embodiment of the invention 10, wherein the first non-infrared reflective layer 22 is disposed upon the second interference layer 20. FIG. 2 illustrates an alternative basic-most embodiment, wherein the first non-infrared reflective layer 22 is disposed between the first substrate 12 and the first interference layer 16.

Figure 3:
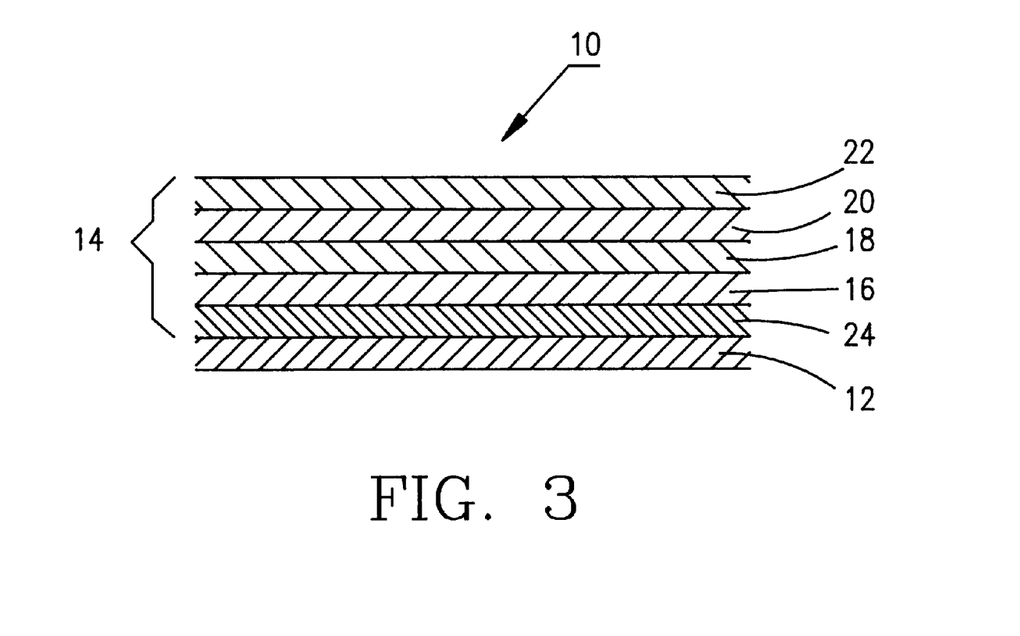
FIG. 3 is a cross-sectional side view of a third heat-reflecting fenestration composite having features of the invention.

In another alternative embodiment of the invention, as illustrated in FIG. 3, the heat reflective composite comprises a second non-infrared reflective layer 24 disposed between the first substrate 12 and the first interference layer 16. Such second non-infrared reflective layer 24 can be made from the same materials as the first non-infrared reflective layer 22. In a typical embodiment, the second non-infrared reflective layer 24 is essentially metallic, such as a nickel alloy, a stainless steel or a titanium alloy having an index of refraction between 1.3 and about 3.0.

Figure 4:
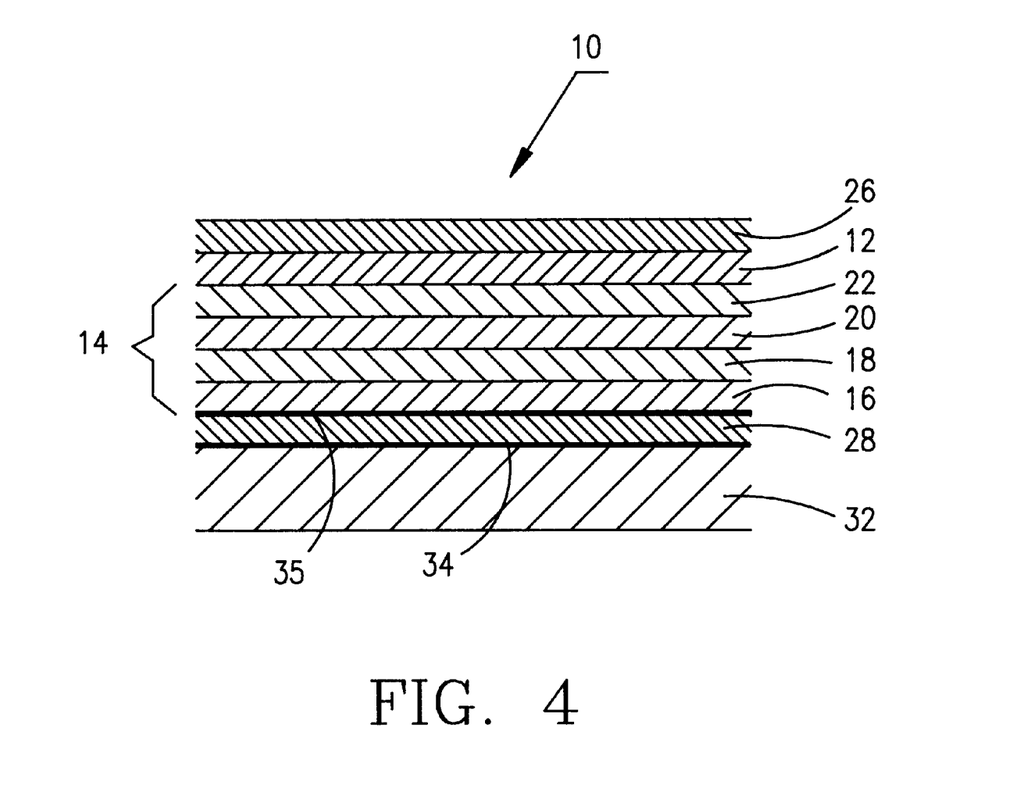
FIG. 4 is a cross-sectional side view of a fourth heat-reflecting fenestration composite having features of the invention.

FIG. 4 illustrates an embodiment of the invention useful as a retrofit product for application to a preexisting glass window pane 32. In FIG. 4, a second substrate 28 is disposed between the pane of glass 32 and the first interference layer 16. The first substrate 12 is disposed onto the first non-infrared reflecting layer 22. A mounting adhesive layer 34 is typically disposed between the second substrate 28 and the pane of glass 32 to improve adhesion between the second substrate 28 and the pane of glass 32. The mounting adhesive layer 34 is most usually an acrylic or polyester based adhesive. Also, a laminating adhesive 35 is typically disposed between the second substrate 28 and the first interference layer 16 to improve adhesive between those two layers. The laminating adhesive layer 35 is most usually a polyester-based adhesive. Both the mounting adhesive layer 34 and the laminating adhesive layer 35 are typically 1–5 microns thick. In the embodiment illustrated in FIG. 4, the composite layers (which include the first substrate 12 down through the second substrate 28) can be manufactured as a stand-alone laminate which can later be retrofitted onto a pane of glass 32.

In the embodiment of the invention illustrated in FIG. 4, the second substrate 28 can be made from the same materials which can compose the first substrate 12. The second substrate 28 can be made from a material having an index of refraction between about 1.4 and about 1.7.

In one embodiment of the invention illustrated in FIG. 4, the first substrate 12 is a sheet of a thermoplastic, such as polyethylene terephthalate. In the embodiment illustrated in FIG. 4, where the first substrate 12 is polyethylene terephthalate, it is typical to provide the first substrate 12 with one of the many UV absorbers commonly used in the art. Such UV absorber protects the composite 14 from degradation due to UV energy. The first substrate 12 can include a benzophenone type ultraviolet light absorbing material, such as is manufactured by BASF Corporation.

Also in the embodiment illustrated in FIG. 4, the invention 10 further comprises a scratch-resistant coating 26 applied to the first substrate 12. A typical scratch resistant coating 26 is an acrylate, having a hardness greater than the substrate and applied by solvent coating between about 1 and about 10 microns in thickness.

Figure 5:
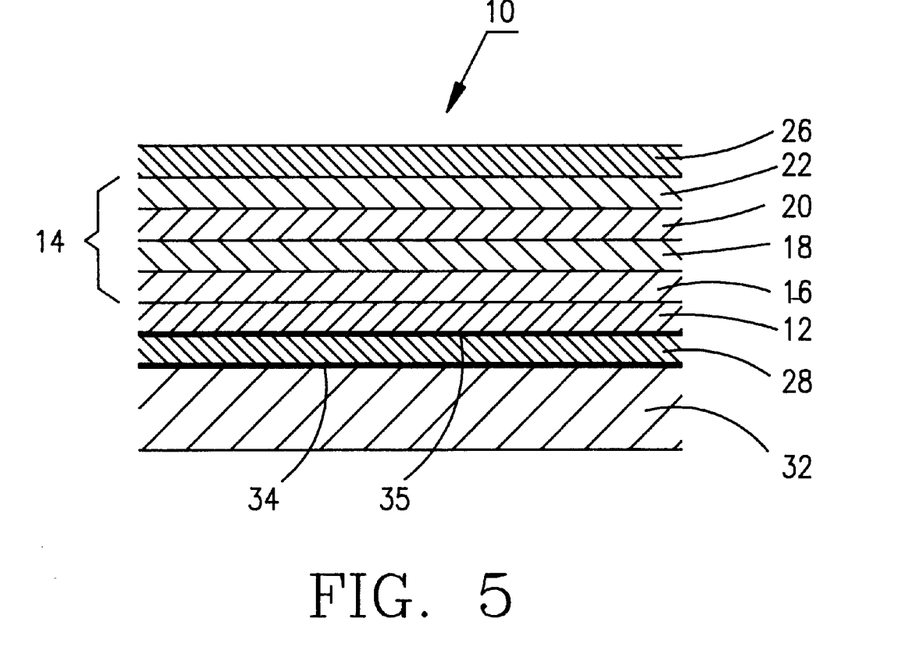
FIG. 5 is a cross-sectional side view of a fifth heat-reflecting fenestration composite having features of the invention.

FIG. 5 illustrates a low emissivity embodiment of the invention. This embodiment also illustrates use of the invention as a retrofit product for installation onto a preexisting pane of glass 32. In the embodiment illustrated in FIG. 5, the composite 10 includes a first substrate 12 and a second substrate 28 disposed contiguous with each other. In this embodiment, a scratch-resistant coating 26 is appended directly to the second non-infrared reflecting layer 22. The composite layers between the second substrate 28 and the scratch-resisting coating 26 can be manufactured as a stand-alone composite which can later be retrofitted onto the pane of glass 32.

Figure 6:
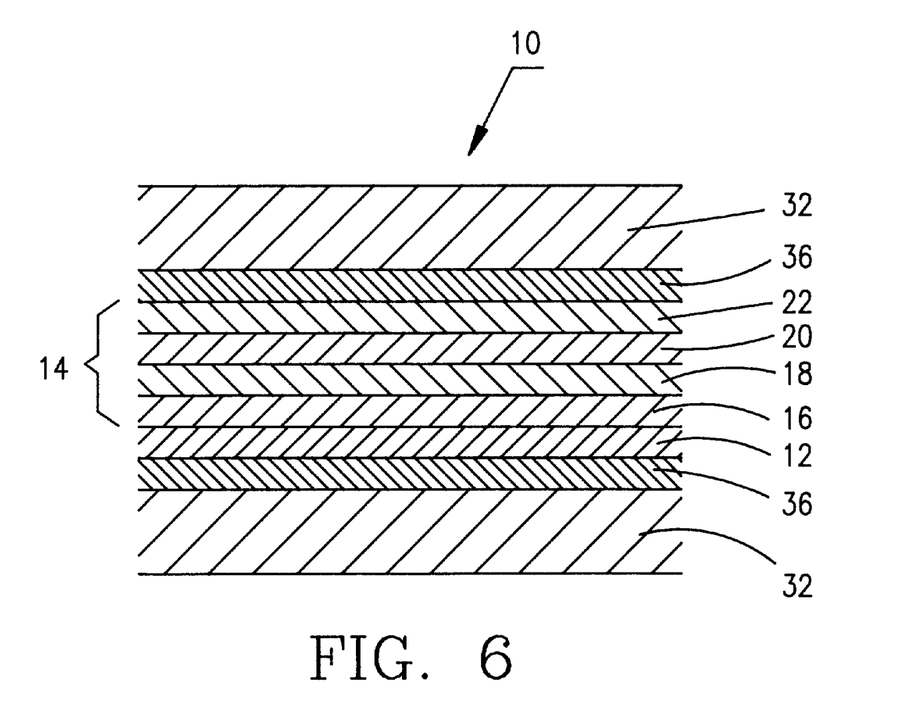
FIG. 6 is a cross-sectional side view of a sixth heat-reflecting fenestration composite having features of the invention.

FIG. 6 illustrates an embodiment of the invention wherein the heat reflecting composite is disposed between a pair of glass panes 32. In the embodiment illustrated in FIG. 6, a layer of polyvinylbutyral 36 is disposed along the surface of each pane of glass 32 facing the composite layers. The layers of polyvinylbutyral 36 form two functions. First, they act as an adhesive to improve adhesion with the glass panes 32. Second, they impart additional mechanical s to the glass panes 32. Such additional mechanical strength is important in automobile windows, hurricane windows and many other varieties of "safety glass."

Figure 7:
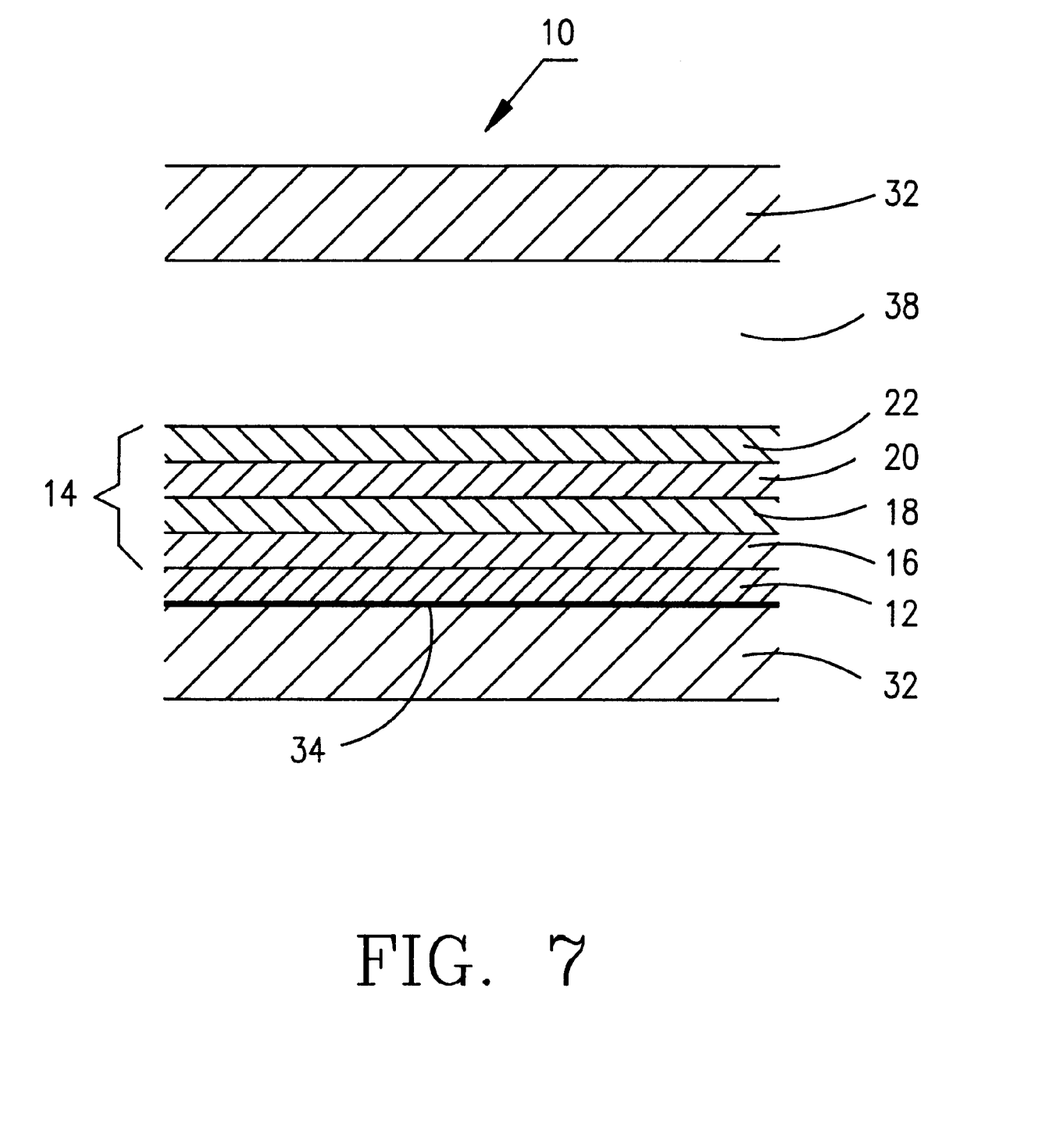
FIG. 7 is a cross-sectional side view of a seventh heat-reflecting fenestration composite having features of the invention.
Figure 8:
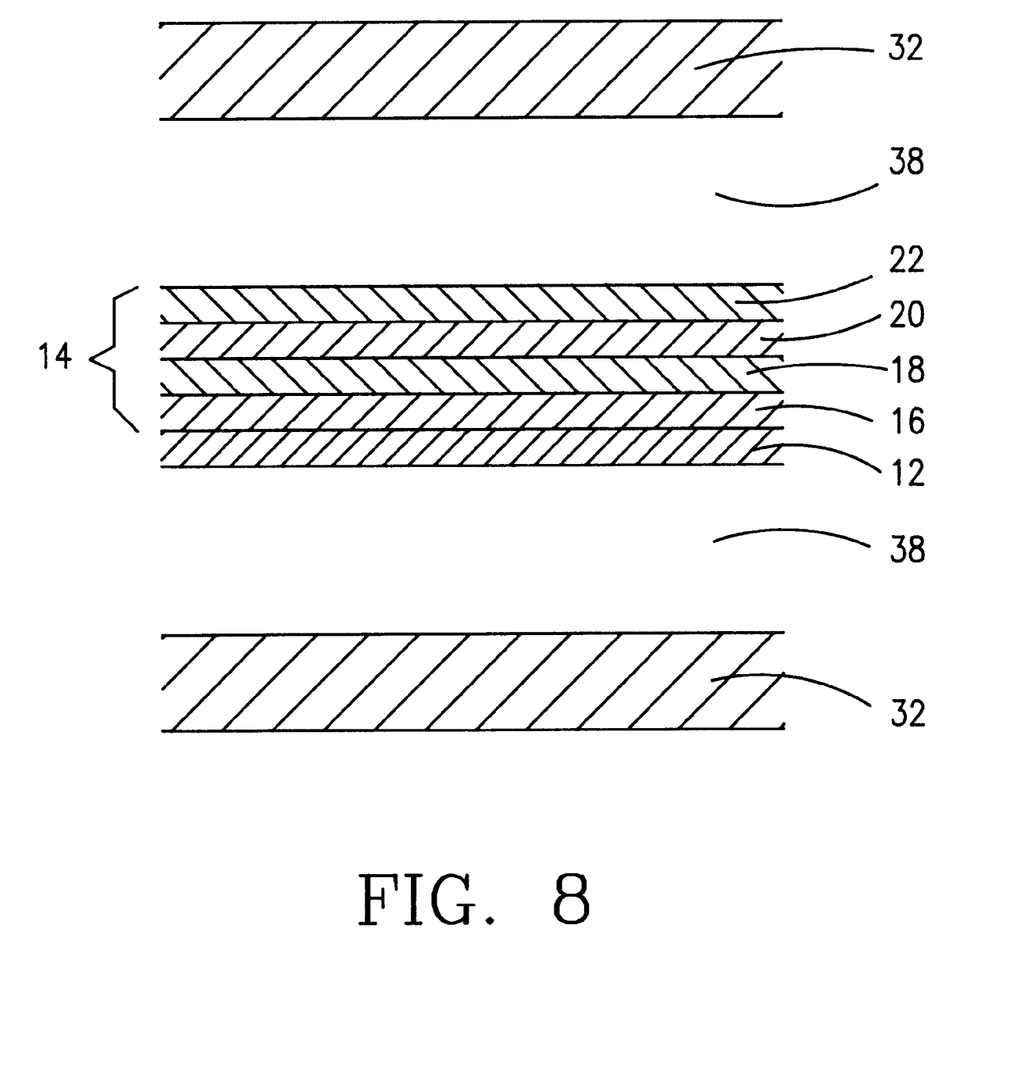
FIG. 8 is a cross-sectional side view of an eighth heat-reflecting fenestration composite having features of the invention.

FIGS. 7 and 8 illustrate embodiments of the invention wherein the composite 10 is also disposed between two panes of glass 32. In the embodiment illustrated in FIG. 7, the second pane of glass 32 is disposed immediately adjacent to the first non-infrared reflecting layer 22, but disposed apart therefrom by a gap 38 of between about 6 mm and about 20 mm. In the embodiment illustrated in FIG. 8, both panes of glass 32 arm spaced apart from the composite by gaps 38 of between about 6 and about 15 mm. The panes of glass 32 can be maintained spaced apart from one or both of the composite 14 by spacers such as those taught in U.S. Pat. No. 4,335,166, the entire of which is incorporated herein by this reference.

In a typical embodiment, the heat reflective composite 10 of the invention reflects less than about 10% of visible light, preferably less than about 8% of visible light.

Preferably, the heat reflective composite 10 of the invention transmits less than about 70% of visible light, most preferably between about 40% and about 60%. It is also preferable that the heat reflective composite 10 reflects at least about 50% of electromagnetic radiation having a wavelength greater than 1200 nm, preferably at least about 70% of such radiation.

Also, it is usually very important that the light transmitted through the heat reflective composite 10 of the invention is of a neutral color. If not neutral, it is preferable that transmitted light have a slight blue-green transmission. These colors may be quantified by the CIE standardized scale of L*a*b* color space. CIE refers to the Commission International de l'Eclanage (i.e., the International Commission on Illumination). The CIE system is generally recognized in the industry. For light transmittance of a neutral to blue-green color, a* for a composite 10 is preferably within the range from 0 and −6, more preferably between 0 and −4 and, more preferably between 0 and −3, and b* for a composite 10 is preferably from 0 and −3 or more preferably between 0 and −2. Light reflected from the heat reflective composite 10 should also be of a neutral color to slightly blue-green. That is, the reflected color range for both a* and b* is preferably between 0 and −8, more preferably between 0 and −6 and, most preferably, between 0 and −3.

EXAMPLES

Figure 9:
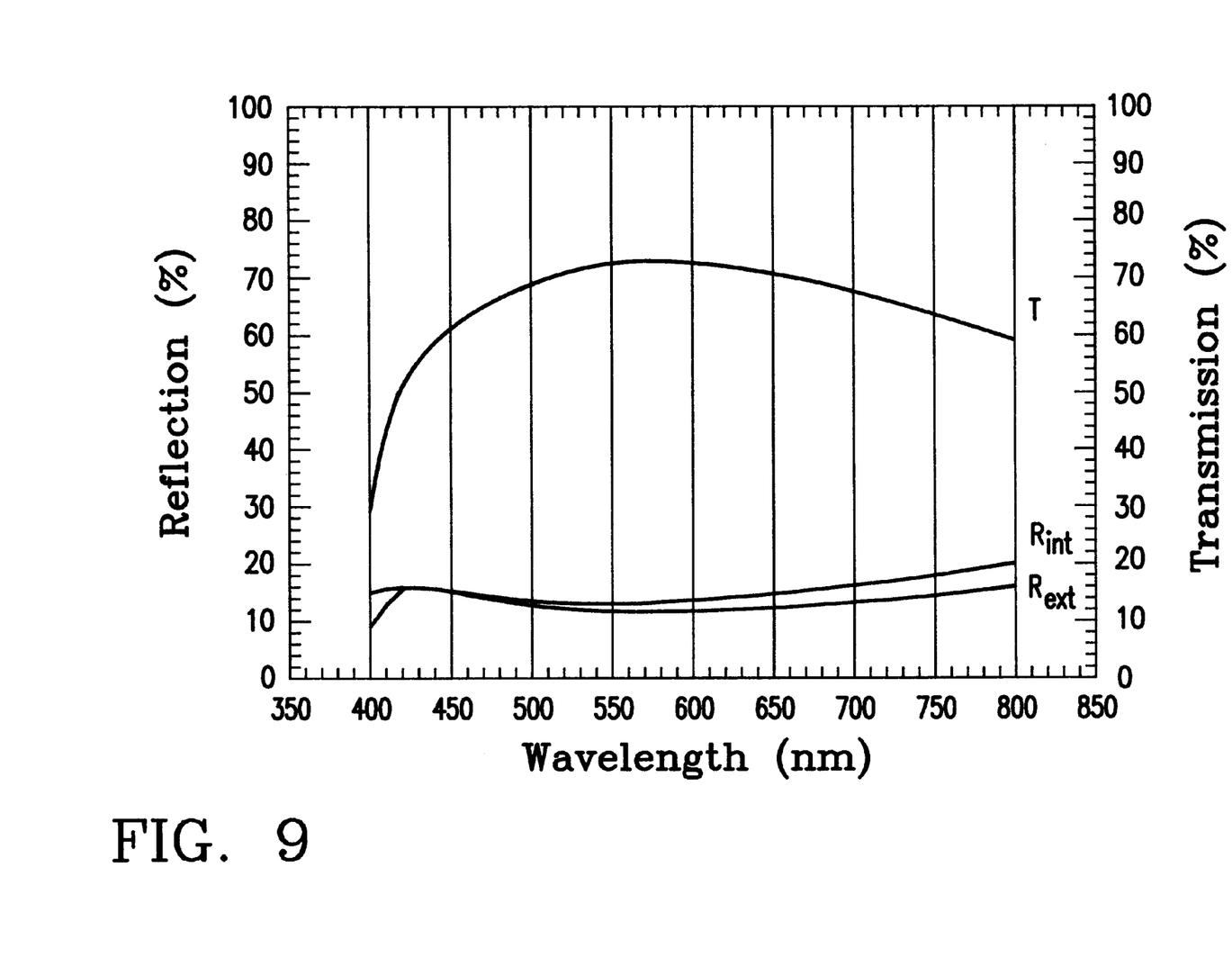
FIG. 9 is a graphical representation of spectral data obtained from a hypothetical typical three-layer composite of the prior art.
Figure 10:
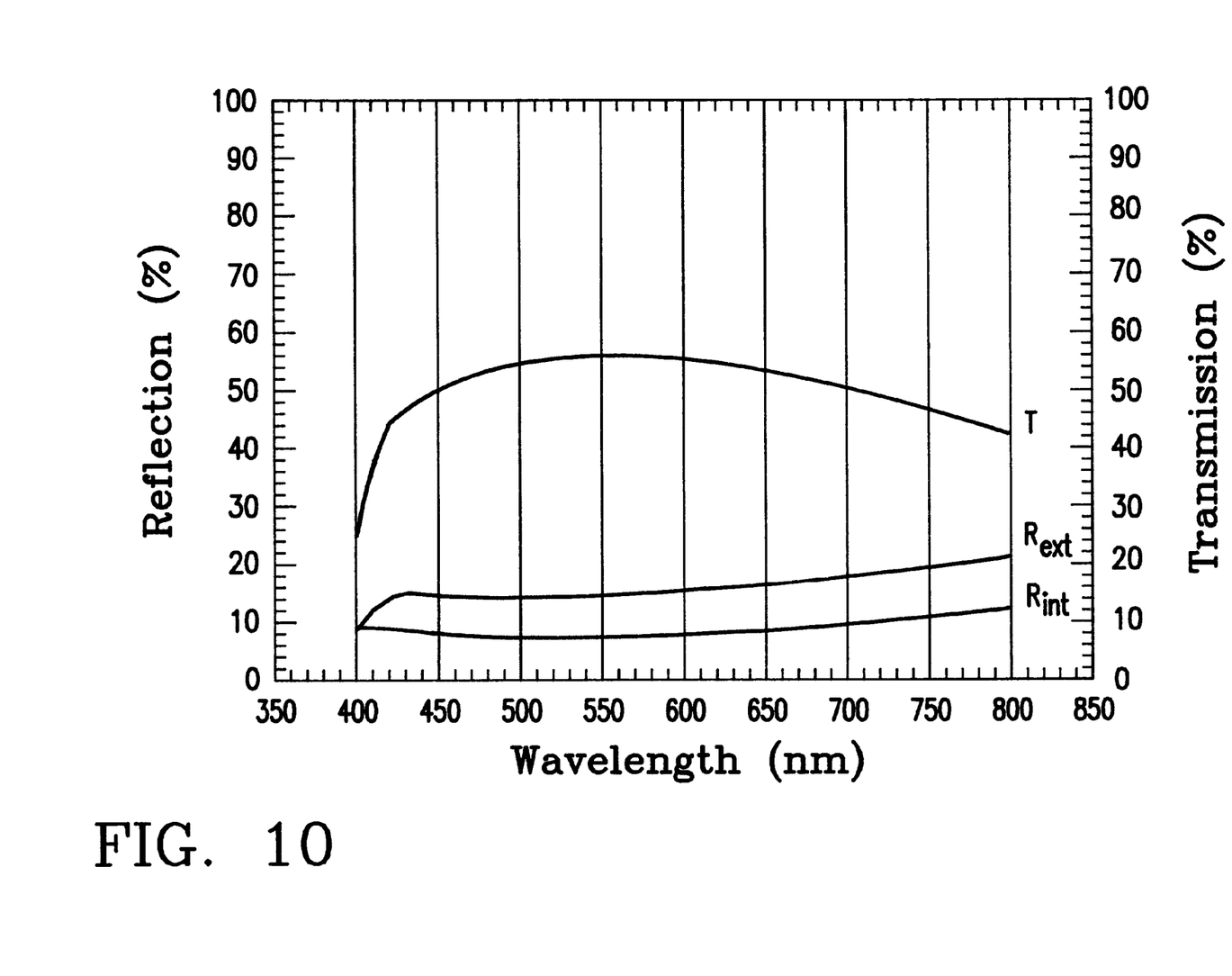
FIG. 10 is a graphical representation of spectral data obtained from a hypothetical typical three-layer composite having features of the invention.

Comparative examples were prepared using computer simulation techniques to test the benefits of the invention. In the first example, a typical three-layer composite of the prior art was simulated. In the second example, an equivalent three-layer composite of the invention was simulated. The oxide thicknesses in both examples were appropriately adjusted to "tune" the composite for optimum performance. Thereafter, the resulting spectrums anticipated from the two examples were compared in FIGS. 9 and 10.

Example 1

A typical three-layer composite of the prior art was simulated as follows:
4 millimeter thick glass (exterior side)
0.01 millimeter thick PET impregnated with UV blocking dye
0.001 mm thick laminating adhesive (index 1.50)
55 nm tin oxide
12 nm silver
45 nm tin oxide
0.01 mm PET (substrate for thin film layers)
0.001 mm acrylate scratch resistant layer
Using standard computer simulation techniques known in the industry, the anticipated optical properties of this example were determined.

Example 2

A three-layer composite having features of the invention was simulated as follows:
4 millimeter thick glass (exterior side)
0.01 millimeter thick PET impregnated with UV blocking dye
0.001 mm thick laminating adhesive (index 1.50)
55 nm tin oxide
12 nm silver
50 nm tin oxide
3 nm Hastelloy C-276
0.01 mm PET (substrate for thin film layers)
0.001 mm acrylate scratch resistant layer Using standard computer simulation techniques known in the industry, the anticipated optical properties of this example were determined.

Comparison of the Examples

Upon comparison of the anticipated spectrum from Examples 1 and 2, the following observations were made:

1. Transmission—Percent of visible light transmission in the composite of the invention (Example 2) was significantly reduced from the percentage of visible light transmission in the prior art composite (Example 1). This is a distinct advantage in many applications.

2. Reflection—In the composite of the invention, the side of the composite where the non-infrared reflective layer is placed has significantly lower reflection than is achieved in the prior art composite. This reduced reflectance (and the ability to locate it on either or both sides of the composite) is a definite advantage. For most fenestration applications of heat reflecting composites, low reflectance is highly desirable on at least one side of the composite.

3. Reflection—In the composite of the invention, the side opposite the non-infrared reflective layer has somewhat increased reflection. When this higher reflectance side is placed towards the exterior, more solar energy is reflected. In this way, solar heat gain passing through a window using a composite of the invention is reduced. This, in turn, reduces cooling energy requirements on the interior of the window.

4. Color—The color of reflected light from both the prior art composite and the composite of the invention were compared. Diagrams of the CIE system coordinates for the reflected light of the two composites are set forth as follows:

| CIE Color Coordinates for Example 1 | | | |
|---|---|---|---|
| | Exterior Reflection | Interior Reflection | Transmission |
| a* | 1.24 | 1.31 | −3.15 |
| b* | −5.23 | −3.09 | 9.48 |

| CIE Color Coordinates for Example 2 | | | |
|---|---|---|---|
| | Exterior Reflection | Interior Reflection | Transmission |
| a* | 0.072 | 3.85 | −2.85 |
| b* | −1.62 | −9.29 | 6.43 |

As can be seen from these diagrams, the reflected light from the composite of the prior art has a distinctly bluish-purple color (a* of 1.24 is slightly red, b* of −5.23 is blue). In comparison, reflected light from the composite of the invention is considerably more neutral (both a* and b* being closer to zero).

The invention has been found to provide an effective three-layer heat reflective stack, even when the heat reflective stack is not open to the air. Thus, even where the heat reflective stack is sandwiched between two substrate layers, the heat reflective stack is effective in reducing heat and light transmission without undue reflectance and without adversely affecting the color of transmitted light.

Having thus described the invention, it should be apparent that numerous structural modifications and adaptations may be resorted to without departing from the scope and fair meaning of the instant invention.

What is claimed is:

1. A heat reflective composite comprising in series:
   (a) a first substrate having an index of refraction; and
   (b) a heat reflective stack disposed upon the first substrate, the heat reflective stack comprising:
      (1) a first interference layer;
      (2) an infrared reflecting metal layer deposited onto the first interference layer;
      (3) a second interference layer; and
      (4) a first non-infrared reflective layer deposited onto the second interference layer, the first non-infrared reflective layer being composed of a material selected from the group of materials consisting of (i) metals having an index of refraction greater than about 1.0 and an extinction coefficient greater than about 2.0 and (ii) non-metals having an index of refraction greater than about 0.5 and an extinction coefficient greater than about 0.5.

2. The heat reflective composite of claim 1 wherein the first non-infrared reflective layer is essentially metallic.

3. The heat reflective composite of claim 1 wherein the index of refraction of the first non-infrared reflective layer is greater than 1.0 in the visible wavelengths.

4. The heat reflective composite of claim 2 wherein the index of refraction of the first non-infrared reflective layer is between about 1.3 and about 3.0.

5. The heat reflective composite of claim 1 wherein the extinction coefficient of the first non-infrared reflective layer is between about 2.1 and about 4.0.

6. The heat reflective composite of claim 1 wherein the first non-infrared reflective layer is chosen from the group of metals consisting of Ti, Ta, Cr, Mo, Ni, stainless steel, mixtures thereof, and tungsten doped titanium nitride.

7. The heat reflective composite of claim 1 wherein the first non-infrared reflective layer is chosen from the group of metals consisting of nickel alloys, stainless steel alloys and titanium alloys.

8. The heat reflective composite of claim 1 wherein the first non-infrared reflective layer is essentially titanium or a titanium alloy.

9. The heat reflective composite of claim 1 wherein the first non-infrared reflective layer is essentially non-metallic.

10. The heat reflective composite of claim 9 wherein the first non-infrared reflective metal layer is chosen from the group of materials consisting of Si, Ge, C and mixtures thereof.

11. The heat reflective composite of claim 1 wherein the index of refraction of the first non-infrared reflective layer increases with wavelength in the visible wavelength.

12. The heat reflective composite of claim 1 wherein the extinction coefficient of the first non-infrared reflective metal layer increases with wavelength in the visible wavelengths.

13. The heat reflective composite of claim 1 wherein the index of refraction and extinction coefficient of the first non-infrared reflective metal layer increases with wavelength in the visible wavelengths.

14. The heat reflective composite of claim 1 wherein a second non-infrared reflective layer is disposed between the first substrate and the first interference layer.

15. The heat reflective composite of claim 1 wherein the heat reflective composite reflects less than about 10% of visible light.

16. The heat reflective composite of claim 1 wherein the heat reflective composite reflects less than about 8% of visible light.

17. The heat reflective composite of claim 1 wherein light transmitted through the heat reflective composite is of a color which is neutral to blue.

18. The heat reflective composite of claim 1 wherein reflective light from the heat reflective composite is a color which is neutral to blue-green.

19. The heat reflective composite of claim 1 wherein light transmitted through and light reflected from the heat reflective composite are both of a color which is neutral to blue-green.

20. The heat reflective composite of claim 1 wherein the heat reflective composite reflects at least about 70% of electromagnetic radiation having a wavelength greater than about 1200 nm.

21. The heat reflective composite of claim 1 wherein a second substrate is disposed immediately adjacent to the first non-infrared reflective layer.

22. The heat reflective composite of claim 1 wherein the heat reflective composite transmits between about 40% and about 60% of light within the visible light range.

23. A heat reflective product comprising in series:
   (a) a first layer of glass;
   (b) a first substrate having an index of refraction;
   (c) a heat reflective stack, the heat reflective stack comprising:
      (1) a first interference layer having an index of refraction which differs from the index of refraction of the substrate by at least about 0.1;
      (2) an infrared reflecting metal layer deposited onto the first interference layer;
      (3) a second interference layer; and
      (4) a first non-infrared reflective layer deposited onto the second interference layer, the first non-infrared reflective layer being composed of a material selected from the group of materials consisting of (i) metals having an index of refraction greater than about 1.0 and an extinction coefficient greater than about 2.0 and (ii) non-metals having an index of refraction greater than about 0.5 and an extinction coefficient greater than about 0.5; and
   (d) a second substrate.

24. A solar reflective product comprising in series:
   (a) a first layer of glass;
   (b) a first layer of polyvinylbutyral;
   (c) a first substrate having an index of refraction;
   (d) a heat reflective stack disposed upon the first substrate, the heat reflective stack comprising:
      (1) a first interference layer having an index of refraction which differs from the index of refraction of the substrate by at least about 0.1;
      (2) an infrared reflecting metal layer deposited onto the first interference layer;
      (3) a second interference layer; and
      (4) a first non-infrared reflective layer deposited onto the second interference layer, the first non-infrared reflective layer being composed of a material selected from the group of materials consisting of (i) metals having an index of refraction greater than about 1.0 and an extinction coefficient greater than about 2.0 and (ii) non-metals having an index of refraction greater than about 0.5 and an extinction coefficient greater than about 0.5;
   (e) a second layer of polyvinylbutyral; and
   (f) a second layer of glass.

25. A heat reflective product comprising in series:
(a) a first layer of glass;
(b) a first substrate having an index of refraction;
(c) a heat reflective stack disposed upon the first substrate, the heat reflective stack comprising:
   (1) a first interference layer having an index of refraction which differs from the index of refraction of the substrate by at least about 0.1;
   (2) an infrared reflecting metal layer deposited onto the first interference layer;
   (3) a second interference layer; and
   (4) a first non-infrared reflective layer deposited onto the second interference layer, the first non-infrared reflective layer being composed of a material selected from the group of materials consisting of (i) metals having an index of refraction greater than about 1.0 and an extinction coefficient greater than about 2.0 and (ii) non-metals having an index of refraction greater than about 0.5 and an extinction coefficient greater than about 0.5; and
(d) a second layer of glass;
wherein the first layer of glass is spaced apart from the first substrate and the second layer of glass is spaced apart from the first non-infrared reflective layer.

26. A heat reflective product comprising in series:
(a) a first layer of glass;
(b) a heat reflective stack disposed upon the first substrate, the heat reflective stack comprising:
   (1) a first interference layer having an index of refraction which differs from the index of refraction of the substrate by at least about 0.1;
   (2) an infrared reflecting metal layer deposited onto the first interference layer;
   (3) a second interference layer; and
   (4) a first non-infrared reflective layer deposited onto the second interference layer, the first non-infrared reflective layer being composed of a material selected from the group of materials consisting of (i) metals having an index of refraction greater than about 1.0 and an extinction coefficient greater than about 2.0 and (ii) non-metals having an index of refraction greater than about 0.5 and an extinction coefficient greater than about 0.5; and
(c) a second layer of glass;
wherein the second layer of glass is spaced-apart from the first non-infrared reflective layer.

* * * * *